United States Patent
Nishikawa et al.

(10) Patent No.: US 9,541,914 B2
(45) Date of Patent: Jan. 10, 2017

(54) WIRE ELECTRIC DISCHARGE MACHINE AND CALCULATION METHOD FOR WIRE SUPPORT POSITIONS OF WIRE ELECTRIC DISCHARGE MACHINE

(71) Applicant: FANUC Corporation, Yamanashi (JP)

(72) Inventors: Ryou Nishikawa, Yamanashi (JP); Shouji Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 305 days.

(21) Appl. No.: 14/183,269

(22) Filed: Feb. 18, 2014

(65) Prior Publication Data
US 2014/0236341 A1    Aug. 21, 2014

(30) Foreign Application Priority Data
Feb. 19, 2013    (JP) .................. 2013-030341

(51) Int. Cl.
G05B 19/18    (2006.01)
B23H 7/06    (2006.01)

(52) U.S. Cl.
CPC ............ G05B 19/182 (2013.01); B23H 7/065 (2013.01); B23H 2500/20 (2013.01)

(58) Field of Classification Search
CPC ................ G05B 19/182; G05B 2219/45221; B23H 7/065; B23H 7/08; B23H 7/105; B23H 7/265; B23H 7/26; B23H 7/32; B23H 2500/20; B23H 1/00; B23H 1/06; B23H 11/006; B23H 7/04; B23H 7/20
USPC ..................................... 219/69.12
See application file for complete search history.

(56) References Cited

U.S. PATENT DOCUMENTS

| | | | |
|---|---|---|---|
| 5,006,691 A * | 4/1991 | Nakayama | B23H 7/065 |
| | | | 219/69.12 |
| 5,200,906 A | 4/1993 | Yamashita et al. | |
| 5,744,775 A * | 4/1998 | Yasuda | B23H 7/04 |
| | | | 219/69.12 |
| 2004/0084419 A1 | 5/2004 | Kato et al. | |
| 2006/0102596 A1* | 5/2006 | Kinoshita | B23H 7/04 |
| | | | 219/69.12 |

(Continued)

FOREIGN PATENT DOCUMENTS

| | | |
|---|---|---|
| CH | 690090 A5 | 4/2000 |
| CN | 1840273 A | 10/2006 |

(Continued)

OTHER PUBLICATIONS

Office Action dated Aug. 24, 2015, corresponding to Chinese Patent Application No. 201410055161.0.

(Continued)

*Primary Examiner* — Nathan L Laughlin
(74) *Attorney, Agent, or Firm* — Hauptman Ham, LLP

(57) ABSTRACT

One arbitrary point on an upper surface of a workpiece and two points at arbitrary heights on a tapered section of the workpiece are measured using a contact detector disposed on an upper wire guide of a wire electric discharge machine to calculate the shape accuracy and tapered angle. Based on the calculated data, the upper and lower wire guide support positions of the upper and lower wire guides are calculated. Using the calculated upper and lower wire guide support positions, electric discharge machining is performed on the workpiece.

6 Claims, 8 Drawing Sheets

(56) References Cited

U.S. PATENT DOCUMENTS

| | | | |
|---|---|---|---|
| 2006/0219667 A1 | 10/2006 | Martin et al. | |
| 2007/0068905 A1* | 3/2007 | Miyajima | B23H 7/065 219/69.12 |
| 2008/0047936 A1* | 2/2008 | Hayashi | B23H 7/065 219/69.12 |
| 2012/0223055 A1* | 9/2012 | Kawahara | B23H 7/065 219/69.12 |

FOREIGN PATENT DOCUMENTS

| | | | |
|---|---|---|---|
| JP | 61257717 A | 11/1986 |
| JP | 6224946 A | 2/1987 |
| JP | 260453 B2 | 12/1990 |
| JP | 11-320266 A | 11/1999 |
| JP | 2000-24839 A | 1/2000 |
| JP | 2003-275925 A | 9/2003 |
| JP | 2004142027 A | 5/2004 |
| JP | 2007-301666 A | 11/2007 |

OTHER PUBLICATIONS

Office Action mailed Jun. 17, 2014, corresponds to Japanese patent application No. 2013-030341.

* cited by examiner

WIRE ELECTRIC DISCHARGE MACHINE AND CALCULATION METHOD FOR WIRE SUPPORT POSITIONS OF WIRE ELECTRIC DISCHARGE MACHINE

RELATED APPLICATIONS

The present application claims priority to Japanese Application Number 2013-030341, filed Feb. 19, 2013, the disclosure of which is hereby incorporated by reference herein in its entirety.

BACKGROUND OF THE INVENTION

1. Field of the Invention

The present invention relates to a wire electric discharge machine having a taper angle correction function using a contact detector and a calculation method for wire support positions of a wire electric discharge machine.

2. Description of the Related Art

When a taper machining is performed on a workpiece by a wire electric discharge machine, the wire support positions of the upper and lower wire guides for supporting the wire electrode are measured by a jig or the like through short-circuit detection of the wire electrode, and the measured wire support positions are set in the controller.

A known technique for correcting the angle of a wire electrode is disclosed in Japanese Patent Application Laid-Open No. 2000-24839. In this technique, the taper angle is corrected through contact of a wire electrode by using a specific jig without performing machining actually. Another known technique for automatically plumbing a wire electrode is disclosed in Japanese Patent Application Laid-Open No. 11-320266.

If electric discharge machining of a workpiece is performed actually, the bending of the wire electrode is increased due to discharge heat, error is included in the taper angle, and the machining precision degrades. In the above technique disclosed in Japanese Patent Application Laid-Open No. 2000-24839, no effects of electric discharge machining are considered, so the machining precision of a machined object degrades. In addition, measurement of the workpiece is not made on the electric discharge machine, so additional machining or subsequent finishing is not supported. The technique disclosed in Japanese Patent Application Laid-Open No. 11-320266 is applicable only to the correction of the angle of a wire electrode, so it is not applicable to tapering in which the correction of both the angle and dimensions is performed.

As described above, the prior art method performs tapering by measuring the support positions (hereinafter referred to as wire support positions) of a wire electrode using a jig before machining and setting the measured data in the controller. Upon completion of tapering, the machined object is measured by a measuring instrument such as a tool maker's microscope or three-dimensional measuring instrument, a correction value is calculated from the measured error, the calculated measurement value is input to the controller, and then re-machining is performed.

Accordingly, the prior art technique is inconvenient in that a measuring instrument is required separately from a wire electric discharge machine and a correction value needs to be calculated according to a mathematical expression. In addition, if a machined workpiece is removed from a wire electric discharge machine, predetermined measurement is performed, and the machined workpiece is mounted on the wire electric discharge machine again, then a deviation arises between the previous and current mounting positions. This makes it very difficult to perform re-machining such as modification after measurement.

SUMMARY OF THE INVENTION

An object of the present invention is, in view of the above problems of the prior art technique, to provide a wire electric discharge machine having a taper angle correction function using a contact detector and a calculation method for wire support positions of a wire electric discharge machine so as to perform measurement on the machine and automatically calculate and input a correction value without a measurement instrument external to the wire electric discharge machine.

The present invention relates to a wire electric discharge machine that performs machining by moving the wire electrode stretched between the upper wire guide and the lower wire guide relative to the table on which a workpiece is placed.

A wire electric discharge machine according to a first aspect of the present invention includes: a wire guide moving means for slanting the wire electrode at a predetermined angle; a contact detector disposed on the upper wire guide; a means for calculating a taper angle of a tapered section of a tapered workpiece mounted on the table, based on positions obtained through measurement, by the contact detector, of two points at arbitrary heights on the tapered section; and a means for calculating wire support positions of the upper wire guide and the lower wire guide that give a target taper angle and a target shape dimension, based on a position of any one of the two points measured, the calculated taper angle, the upper surface position of the workpiece obtained through measurement by the contact detector, and a position at which the tapered section and the upper surface of the workpiece intersect when there is no machining error.

The wire electric discharge machine may further include a storage means for performing the measurement at intervals of the predetermined taper angle and storing in advance the wire support positions of the upper wire guide and the lower wire guide at intervals of the predetermined taper angle, in which, when a tapering command is issued, the upper wire guide and the lower wire guide may be moved in accordance with the wire support positions of the upper wire guide and the lower wire guide stored in the storage means.

The wire electric discharge machine may perform the measurement for each of tapered sections of a machined workpiece so as to calculate the wire support positions of the upper wire guide and the lower wire guide of each of the tapered sections.

A wire electric discharge machine according to a second aspect of the present invention includes: a wire guide moving means for slanting the wire electrode at a predetermined angle; a contact detector disposed on the upper wire guide; a means for calculating a taper angle of a tapered section of a tapered workpiece mounted on the table, based on positions obtained through measurement, by the contact detector, of two points at arbitrary heights on the tapered section; and a means for calculating wire support positions of the upper wire guide and the lower wire guide that give a target taper angle and a target shape dimension, based on a position of any one of the two points measured, a position of the tapered section at a height of the position of the one of the two points when there is no machining error, and the calculated taper angle.

The wire electric discharge machine may further include a storage means for performing the measurement at intervals of the predetermined taper angle and storing in advance the wire support positions of the upper wire guide and the lower wire guide at intervals of the predetermined taper angle, in which, when a tapering command is issued, the upper wire guide and the lower wire guide may be moved in accordance with the wire support positions of the upper wire guide and the lower wire guide stored in the storage means.

The wire electric discharge machine may perform the measurement for each of tapered sections of a machined workpiece so as to calculate the wire support positions of the upper wire guide and the lower wire guide for each of the tapered sections.

A method for calculating wire support positions of a wire electric discharge machine according to the first aspect of the present invention includes the steps of: performing tapering in accordance with a machining program; measuring two arbitrary points on a tapered section using a contact detector disposed on the upper wire guide, calculating an angle of the tapered section based on positions of the two measured points; and calculating wire support positions of the upper wire guide and the lower wire guide that give a target taper angle and a target shape dimension based on a position of any one of the two measured points, the calculated taper angle, and a position at which the tapered section and an upper surface of the workpiece intersect when there is no machining error.

A method for calculating wire support positions of a wire electric discharge machine according to the second aspect of the present invention includes the steps of: performing tapering in accordance with a machining program; measuring two arbitrary points on a tapered section using a contact detector disposed on the upper wire guide; calculating an angle of the tapered section based on positions of the two measured points; and calculating wire support positions of the upper wire guide and the lower wire guide that give a target taper angle and a target shape dimension based on a position of any one of the two measured points, a position of the tapered section when there is no machining error at a height of the position of the one of the two measured points, and the calculated taper angle.

The present invention provides a wire electric discharge machine having a taper angle correction function and a calculation method for wire support positions of a wire electric discharge The taper angle correction function uses a contact detector that performs measurement on a wire electric discharge machine without an external measurement instrument, calculate a correction value automatically, and inputs the calculated correction value.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
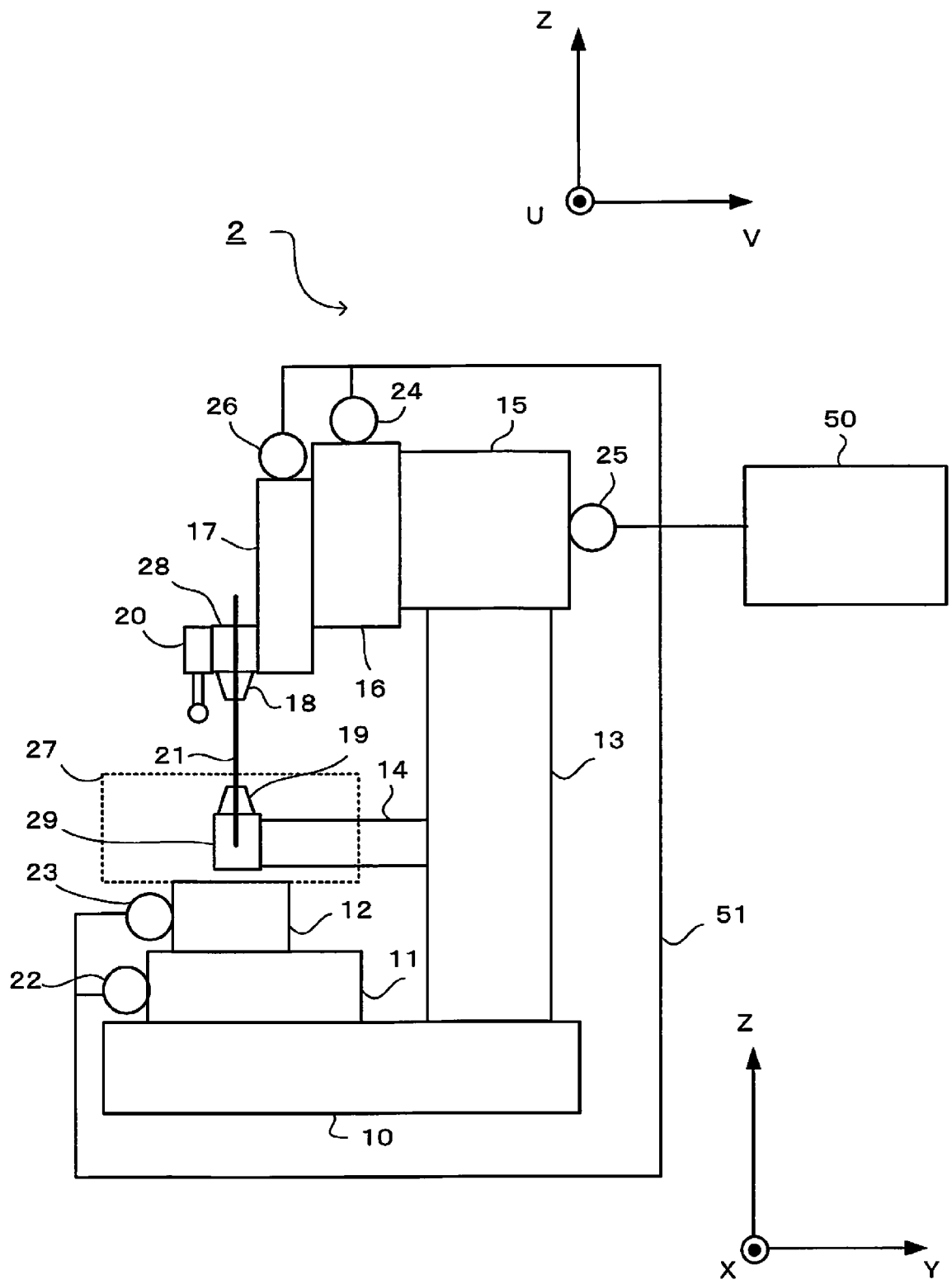
FIG. 1 is a diagram illustrating a wire electric discharge machine.

FIG. 1 shows the structure of a wire electric discharge machine according to an embodiment of the present invention.

A wire electric discharge machine 2 machines a workpiece by generating discharge between a wire electrode 21 and the workpiece to be machined. The wire electric discharge machine 2 includes an X-axis saddle 11 on a bed 10, which moves in the X-axis direction when driven by an X-axis motor 22. The wire electric discharge machine 2 further includes a Y-axis table 12 on an X-axis saddle 11, which moves in the Y-axis direction when driven by a Y-axis motor 23. A work tank 27, which incorporates a workpiece mount (not shown) on which the workpiece is placed, is secured to the Y-axis table 12.

The column 13 extends vertically from the bed 10. The column 13 has a V-axis saddle 15 thereon. The V-axis saddle 15 moves in the V-axis direction when driven by the V-axis motor 25. The V-axis direction is the same as the Y-axis direction. A U-axis saddle 16 is attached to the V-axis saddle 15. The U-axis saddle 16 moves in the U-axis direction when driven by a U-axis motor 24. The U-axis direction is the same as the X-axis direction. A Z-axis slider 17 is attached to the U-axis saddle 16. The Z-axis slider 17 moves in the Z-axis direction when driven by a Z-axis motor 26.

An upper wire guide 28 is attached to the Z-axis slider 17. The upper wire guide 28 includes an upper nozzle 18 for discharging machining fluid and supports the wire electrode 21 above the workpiece. An arm 14 is mounted horizontally on a side of the column 13. A lower wire guide 29 is provided at the end of the arm 14. The lower wire guide 29 has a lower nozzle 19 for discharging machining fluid, disposed below the workpiece placed on the workpiece mount included in the work tank 27 secured to the Y-axis table 12, and supports the wire electrode 21 below the workpiece. The upper wire guide 28 and the lower wire guide 29 have the same structure as the well-known technique in which an upper die guide and a lower die guide are included. The upper die guide and the lower die guide substantially support the wire electrode 21.

The X-axis motor 22, the Y-axis motor 23, the Z-axis motor 26, the U-axis motor 24, and the V-axis motor 25 are connected to a controller 50 through a power/signal line 51. Electric power is supplied to motors for respective axes by the controller 50 having amplifiers (not shown) and various signals are transmitted to, and received from, the controller 50. The controller 50, which controls the entire wire electric discharge machine, includes a calculation device, a display device, input/output interfaces for signals, an amplifier, and a storage device for storing various types of data (these devices are not shown). In FIG. 1, the X-axis and U-axis extend perpendicular to the drawing sheet of FIG. 1, the Y-axis and V-axis extend in the right/left direction in the drawing sheet of FIG. 1, and the Z-axis extends in the upper/lower direction in the drawing sheet of FIG. 1.

The structure of the above wire electric discharge machine 2 is already known. In the present invention, a means (more specifically, a program) for correcting the taper angle and machining shape using a contact detector described below is stored in a memory of the controller 50.

The following describes a method for matching the angle of gradient of the wire electrode to the offset amount of a machining path (wire electrode path) to achieve a desired machining shape (target dimensions).

Figure 2:
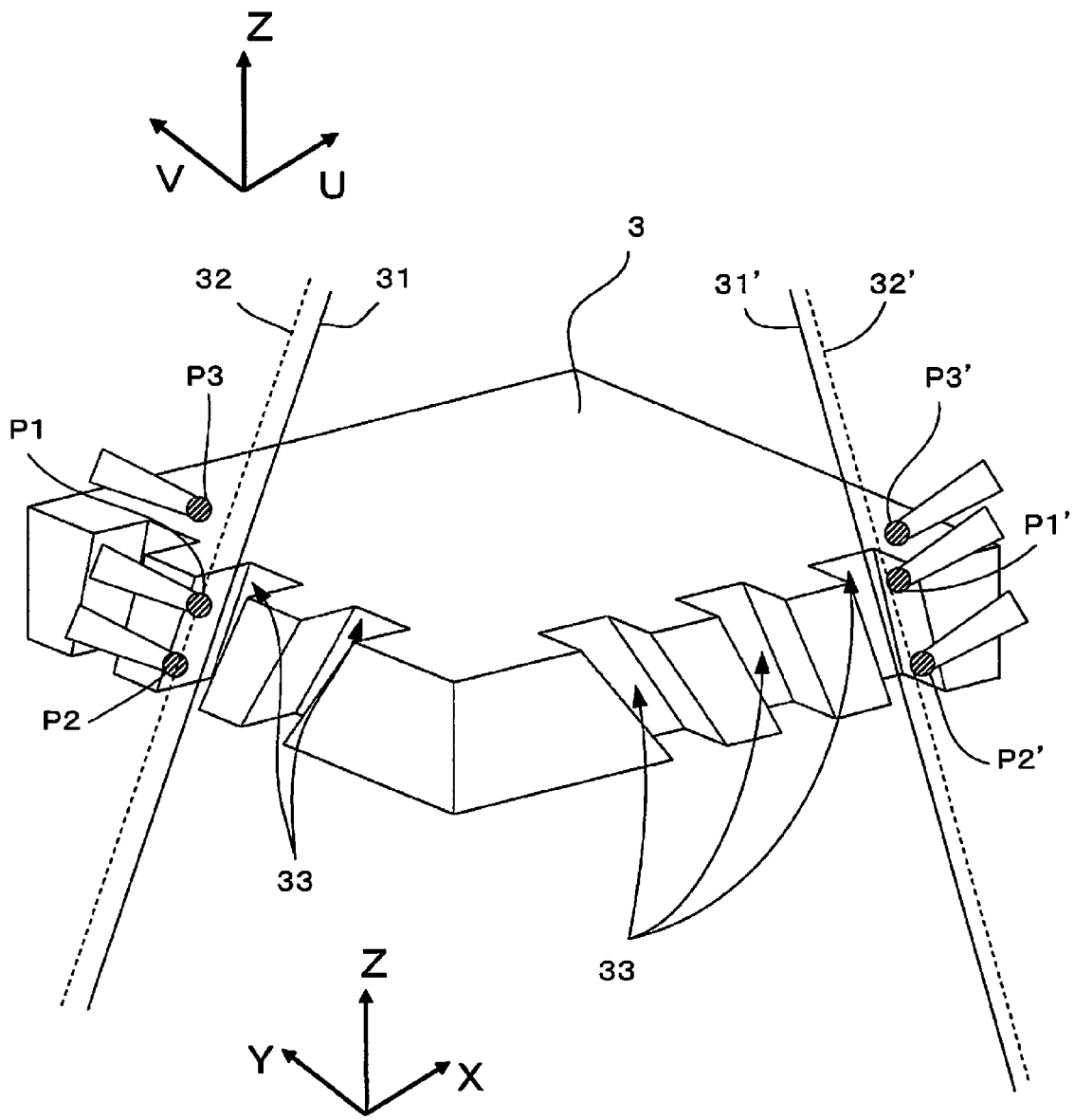
FIG. 2 is a diagram illustrating a method for matching the oblique angle of a wire electrode to the offset amount of a path of the wire electrode so as to achieve a desired machining shape (target dimensions)

FIG. 2 is a diagram illustrating a method for matching the angle of gradient of the wire electrode to the offset amount of a machining path (path of the wire electrode) so as to achieve a desired machining shape (target dimensions). More specifically, the method corrects the angle of gradient of the wire electrode and the offset amount by changing the fulcrum position of the guide.

In a certain tapered section 33 (slant machined part), symbol P1 represents a first tapered section measurement position, symbol P2 represents a second tapered section measurement position, and symbol P3 represents a measurement position (workpiece height measurement position) on the upper surface of the workpiece. In another tapered section, symbol P1' represents the first tapered section measurement position, symbol P2' represents the second tapered section measurement position, and symbol P3' represents a measurement position on the upper surface of the workpiece. In addition, reference numeral 31 represents the wire electrode that is being machined and reference numeral 32 represents the line of intersection between a surface perpendicular to the path direction of the wire electrode (the travel direction of the wire electrode when a program created by an NC program moves the wire electrode) and the tapered section.

The deviation of the taper angle of the tapered section and the deviation of the shape dimension with respect to a desired machining shape are corrected as described below.

(1) When an arbitrary taper angle and machining shape are corrected, test shapes having a plurality of different taper angles are machined as shown in FIG. 2, arbitrary two points in the direction (the direction perpendicular to the travel direction of the wire electrode on the workpiece side when a program created by an NC program moves the wire electrode) perpendicular to the path of the wire electrode and one point on the upper surface of a workpiece 3 are measured by a contact detector 20 in each tapered section for the tapered parts, the data (correct product dimensions at the same height as in one point to be measured) of a target position at the same height as in one point to be measured is input to the numerical controller in advance, calculation is performed on the numerical controller to correct the wire support positions of the upper wire guide 28 and the lower wire guide 29, and the target taper angle and shape dimension are obtained. As combinations of arbitrary two points and one point on the upper surface of the workpiece 3, (P1, P2, P3) and (P1', P2', P3') are indicated in FIG. 2. Measurement on the upper surface of the workpiece is performed using <Method for obtaining wire support position u based on the workpiece height> described later.

First, a method for calculating an accurate wire support position u of the lower wire guide 29 will be described. The calculation method uses the heights of measurement points or the height of a workpiece.

<Method for Obtaining Wire Support Position u Based on the Heights of Measurement Points>

This method will be described with reference to FIGS. 3 and 4. In the method, the positions of point P1 (x1, y1, z1) and point P2 (x2, y2, z2) shown in FIG. 3 are measured by the contact detector.

Figure 3:
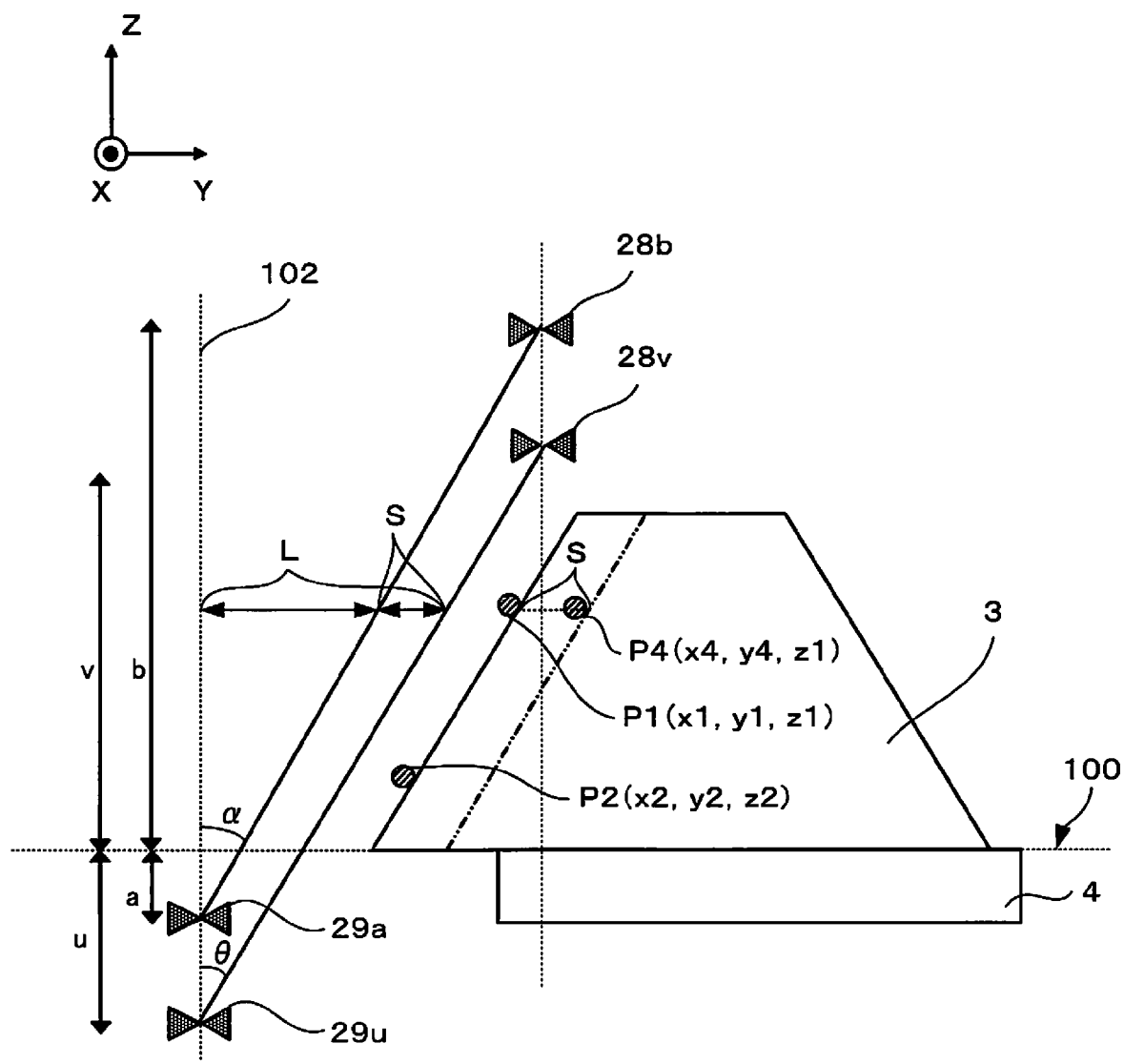
FIG. 3 is a diagram illustrating a method for obtaining the accurate wire support position of an upper wire guide and a lower wire guide based on the heights of tapered section measurement positions.

In calculation of correction, when each position (data of each position) is set as shown in FIG. 3, gradient a of the tapered section of the workpiece 3 placed and machined on the workpiece mount 4, distance u from upper surface 100 of the workpiece mount 4 at the accurate lower wire guide support position 29u of the lower wire guide 29, and distance v from the upper surface 100 of the workpiece mount 4 at the accurate upper wire guide support position 28v of the upper wire guide 28 are represented by the following expressions. Note that the accurate lower wire guide support position 29u and the accurate upper wire guide support position 28v do not mean the V-axis and the U-axis, respectively.

First, a method for obtaining gradient α (oblique angle) of the tapered section will be described with reference to the FIG. 4.

Figure 4:
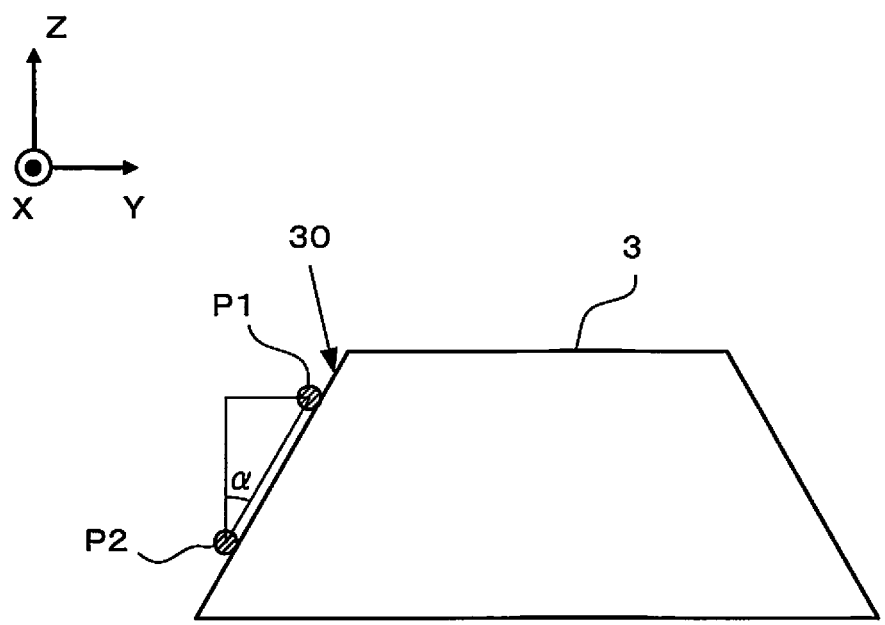
FIG. 4 is a diagram illustrating a cross section having a plane orthogonal to a tapered surface and the XY plane.

FIG. 4 is a diagram illustrating a cross section having a plane perpendicular to a tapered surface and the XY plane (cross section having a plane perpendicular to the travel direction of the wire on the workpiece side when a program created by an NC program moves the wire electrode at a position where the tapered section of the workpiece is present). In FIG. 4, the tapered surface is represented as a surface oriented in an arbitrary direction not limited to the surface including a direction parallel to the X-axis. Since the gradient of the wire electrode during wire electric discharge machining is transferred to the gradient of the machined object, oblique angle α is obtained based on the two measured points.

Symbols θ, a, and b in the following expressions (3) to (12) will be described below. Symbol θ represents a taper angle instructed in a program. Symbol a represents the distance from the upper surface 100 at a wire support position 29a of the lower wire guide 29 during machining. Symbol b represents the distance from the upper surface 100 at the wire support position 28b of the upper wire guide 28 during machining. Since symbols "θ", "a", and "b" indicate data obtained by analyzing a machining program when the controller 50 executes the machining program, they are not data to be newly measured.

$$\tan\alpha = \frac{\sqrt{(x1-x2)^2 + (y1-y2)^2}}{|z1-z2|} \quad (1)$$

The above expression (1) can be transformed as expression (2).

$$\alpha = \arctan\left(\frac{\sqrt{(x1-x2)^2 + (y1-y2)^2}}{|z1-z2|}\right) \quad (2)$$

As shown in FIG. 3, distance L from a wire electrode vertical position 102 (position at which the wire electrode is parallel to the Z-axis and perpendicular to the XY plane) on the XY plane at the height z1 to the target position (position of the machined workpiece with the target dimensions) can be obtained by assigning tan θ, tan α, error S between the measurement position and the target value (the error relative to the position of the machined workpiece with the target dimensions) to the following expression (3). Error S can be obtained in the following expression (4). Point P4 (x4, y4, z1) used in expression (4) is data that is stored in advance in the memory of the controller 50 in association with the measurement point P1.

$$L=(u+z1)\tan\theta=(a+z1)\tan\alpha+S \quad (3)$$

$$S=\sqrt{(x4)^2+(y4)^2}-\sqrt{(x1)^2+(y1)^2} \quad (4)$$

The following expression (5) for obtaining u is provided by transforming the above expression (3).

$$u = (z1+a)\frac{\tan\alpha}{\tan\theta} + \frac{S}{\tan\theta} - z1 \quad (5)$$

The following expression (6) for obtaining "u" is provided by assigning the above expression (4) to the above expression (5) and transforming the expression (5).

$$u = (z1+a)\frac{\tan\alpha}{\tan\theta} + \frac{\sqrt{(x4)^2+(y4)^2} - \sqrt{(x1)^2+(y1)^2}}{\tan\theta} - z1 \quad (6)$$

Supplementary explanation of the above expression (6) will be given below. Coordinates x4, y4 are not actually measured by the contact detector, but set as target coordinates at the workpiece height z1. Point P5 (x5, y5, z3) used in the following expression (8) is data that is stored in advance in the memory of the controller 50 in association with measurement point P1.

<Method for Obtaining Wire Support Position u Based on the Workpiece Height>

Figure 5:
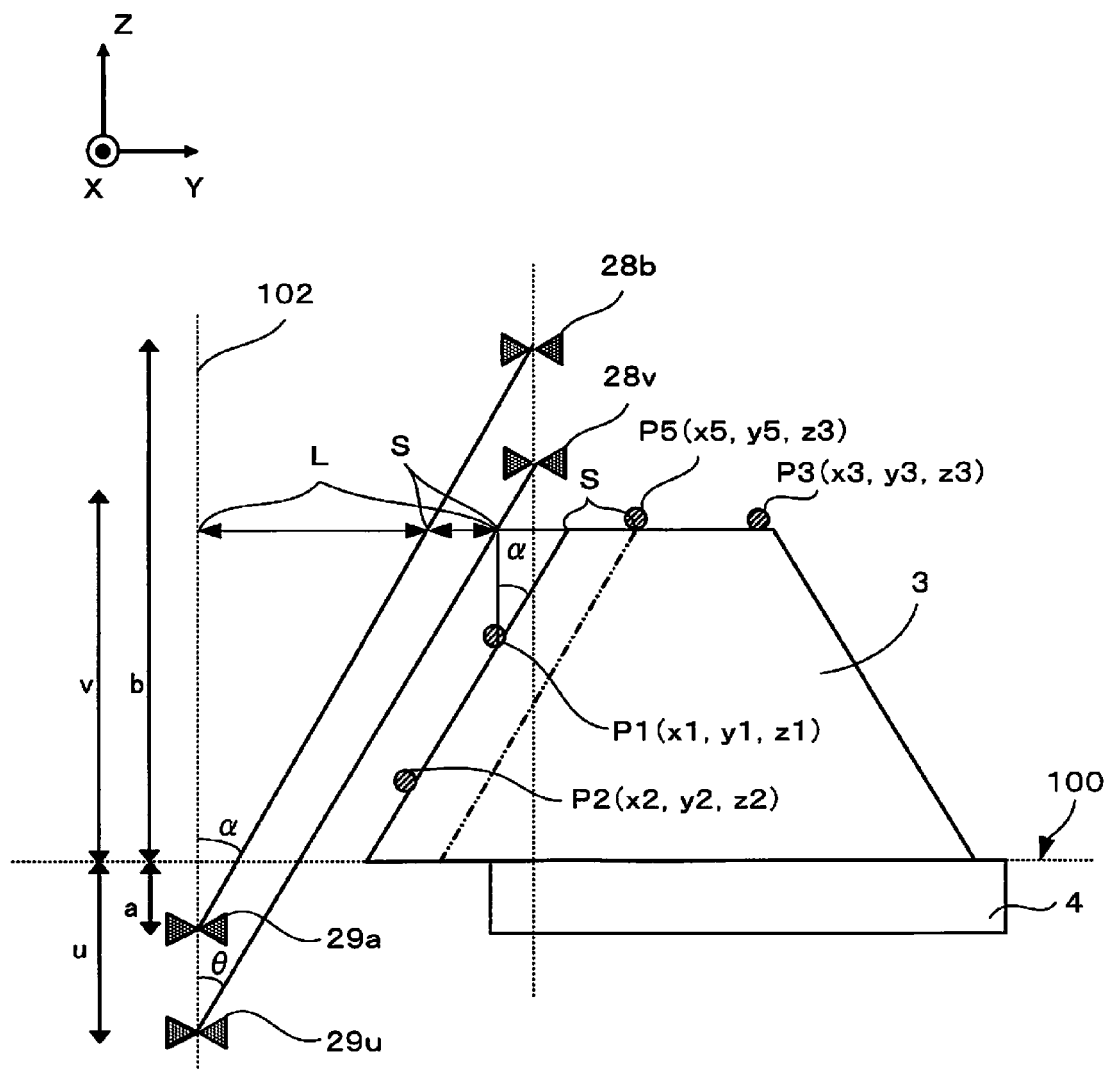
FIG. 5 is a diagram illustrating a method for obtaining the accurate wire support position of the upper wire guide and the lower wire guide based on the height of an upper surface of a workpiece.

This method will be described with reference to FIG. 5. In this method, the three positions of point P1 (x1, y1, z1), point P2 (x2, y2, z2), and point P3 (x3, y3, z3) shown in FIG. 5 are measured by the contact detector. Distance L from the wire electrode vertical position to the target position on the XY plane at the height z3 is obtained by assigning tan θ, tan α, and error S between the measurement position and the target value to the following expression (7).

$$L=(u+z3)\tan\theta=(a+z3)\tan\alpha+S \quad (7)$$

Symbol S in the above expression (7) is represented as the following expression (8) using the target position at the workpiece height, the measurement position 1, and tan α.

$$S=\sqrt{(x5)^2+(y5)^2}-(\sqrt{(x1)^2+(y1)^2}+(z3-z1)\tan\alpha) \quad (8)$$

Symbol u can be obtained from the following expression (9) by transforming the above expression (7).

$$u = (z3+a)\frac{\tan\alpha}{\tan\theta} + \frac{S}{\tan\theta} - z3 \quad (9)$$

Symbol u is obtained from the following expression (10) provided by assigning the above expression (8) to the above expression (9).

$$u = (z3+a)\frac{\tan\alpha}{\tan\theta} + \quad (10)$$

$$\frac{\sqrt{(x5)^2+(y5)^2} - (\sqrt{(x1)^2+(y1)^2} + (z3-z1)\tan\alpha)}{\tan\theta} - z3$$

Supplementary explanation of the above expression (10) will be given below. Coordinates x5, y5 are not actually measured by the contact type detector, but set as target coordinates at the workpiece height z1.

Next, a calculation method for an accurate upper wire guide support position v will be described.

<Method for Calculating v>

Figure 6:
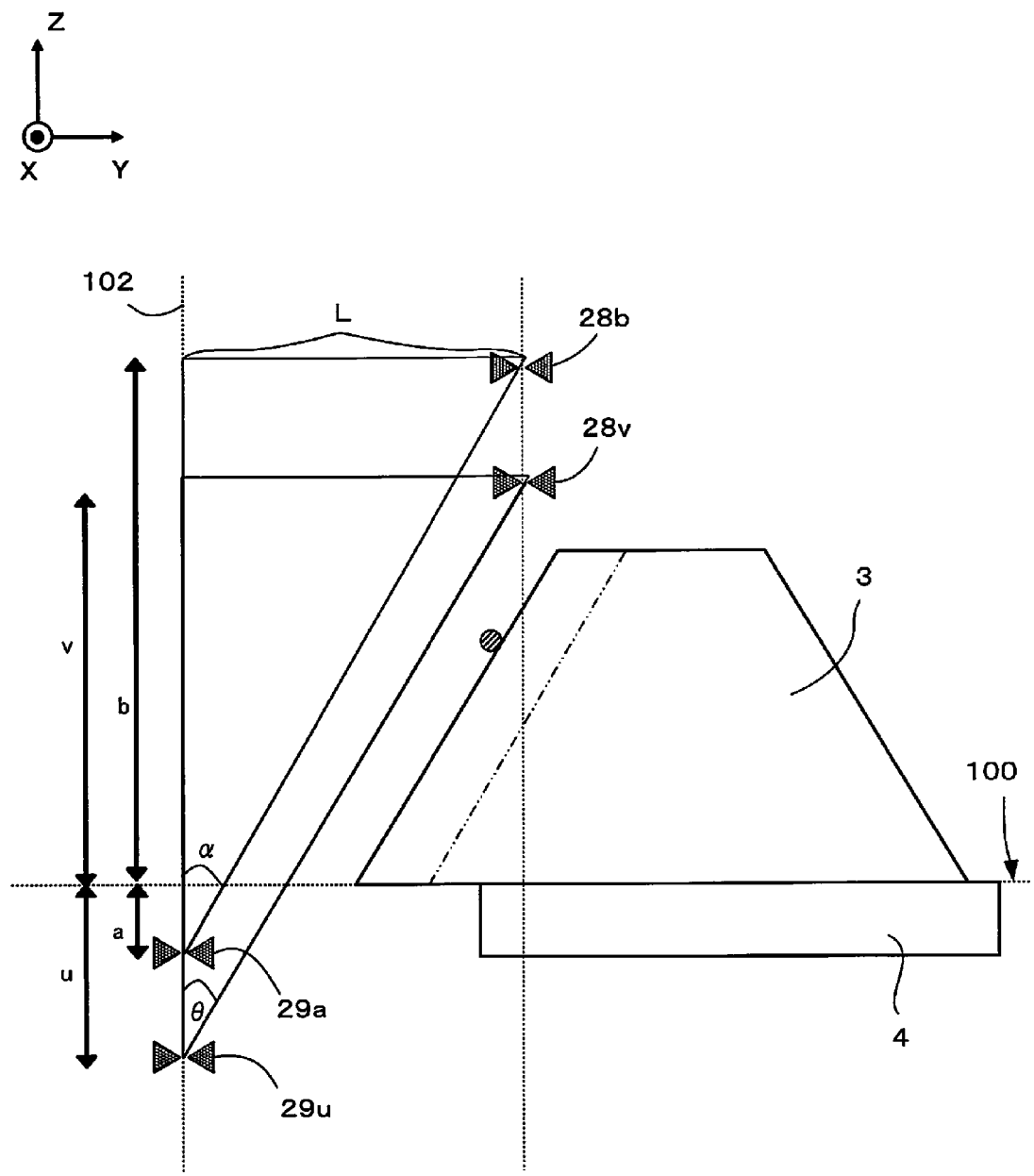
FIG. 6 is a diagram illustrating a method for obtaining the accurate wire support positions of the wire guides.

As shown in FIG. 6, magnitude L of the gradient of the wire electrode is represented by assigning tan α and tan θ to expression (11).

$$L=(u+v)\tan\theta=(a+b)\tan\alpha \quad (11)$$

Symbol v is obtained by the following expression (12) provided by transforming the above expression (11).

$$v = (a+b)\frac{\tan\alpha}{\tan\theta} - u \quad (12)$$

Figure 7:
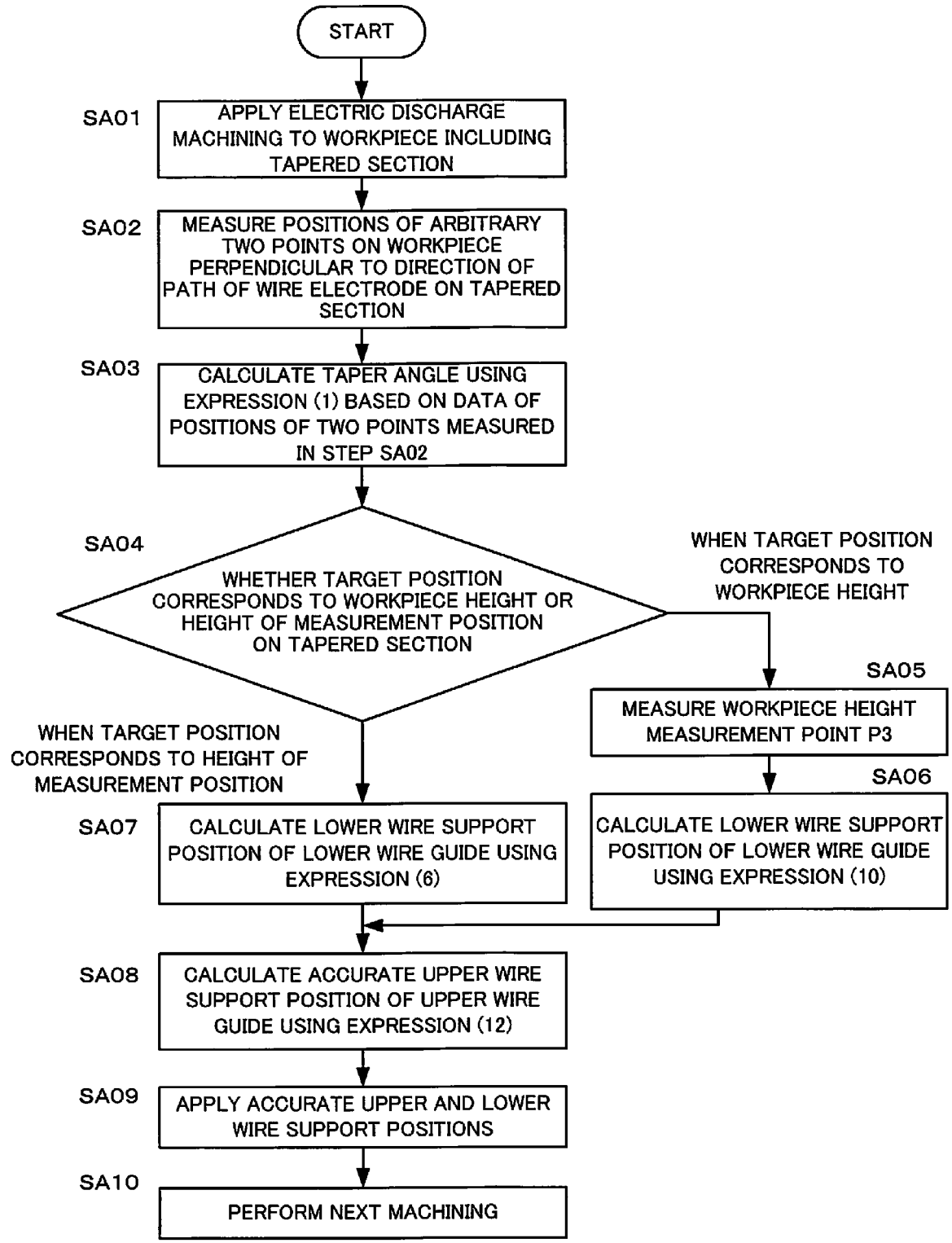
FIG. 7 is a diagram showing a flow of wire electro-discharge machining and correction processing.

The subsequent machining is performed by using the accurate upper and lower wire guide support positions obtained by the above method. A series of steps for the machining is indicated by the flowchart shown in FIG. 7. The machining will be described according to the steps.

[Step SA01] Electric discharge machining is applied to the workpiece including the tapered section.

[Step SA02] The positions (first tapered section measurement point P1 and second tapered section measurement point P2) of arbitrary two points on the workpiece in the direction (the direction perpendicular to the travel direction of the wire electrode on the workpiece side when a program created by an NC program moves the wire electrode) perpendicular to the path of the wire electrode on the tapered section are measured.

[Step SA03] The taper angle of the tapered section is calculated based on the data of the positions of the two points measured in step SA02.

[Step SA04] A decision is made as to whether the target position corresponds to the workpiece height or the height of the measurement position (that is, a decision is made as to whether the position of the workpiece having the target dimensions is obtained from the workpiece height or from the height of the measurement position). If the target position corresponds to the workpiece height, the processing proceeds to step SA05. If the target position corresponds to the height of the measurement position, the processing proceeds to step SA07.

[Step SA05] The workpiece height measurement point P3 is measured.

[Step SA06] The accurate lower wire support position of the lower wire guide is calculated by expression (10) and the processing proceeds to step SA08.

[Step SA07] The accurate lower wire support position of the lower wire guide is calculated by expression (6) and the processing proceeds to step SA08.

[Step SA08] The accurate upper wire support position of the upper wire guide is calculated by expression (12).

[Step SA09] The accurate upper and lower wire support positions are applied. Specifically, when the wire electrode is moved relative to the workpiece according to the machining program, correction is made during the relative movement so that the upper and lower wire support positions calculated in each step are achieved.

[Step SA10] The next machining is performed.

At a taper angle at which machining and measurement have not been performed, the value of a retaining fulcrum position obtained through linear correction (linear approximation) using the values of measured angles is used. Since the correction value of the support position of the wire electrode depends on not only the angle of gradient of the wire electrode but also the slant orientation (toward the U-axis or the V-axis) of the wire electrode. Accordingly, the support position can be corrected more accurately using a correction value matched not only to the slant angle of the workpiece but also to the U-axis and V-axis directions.

Figure 8:
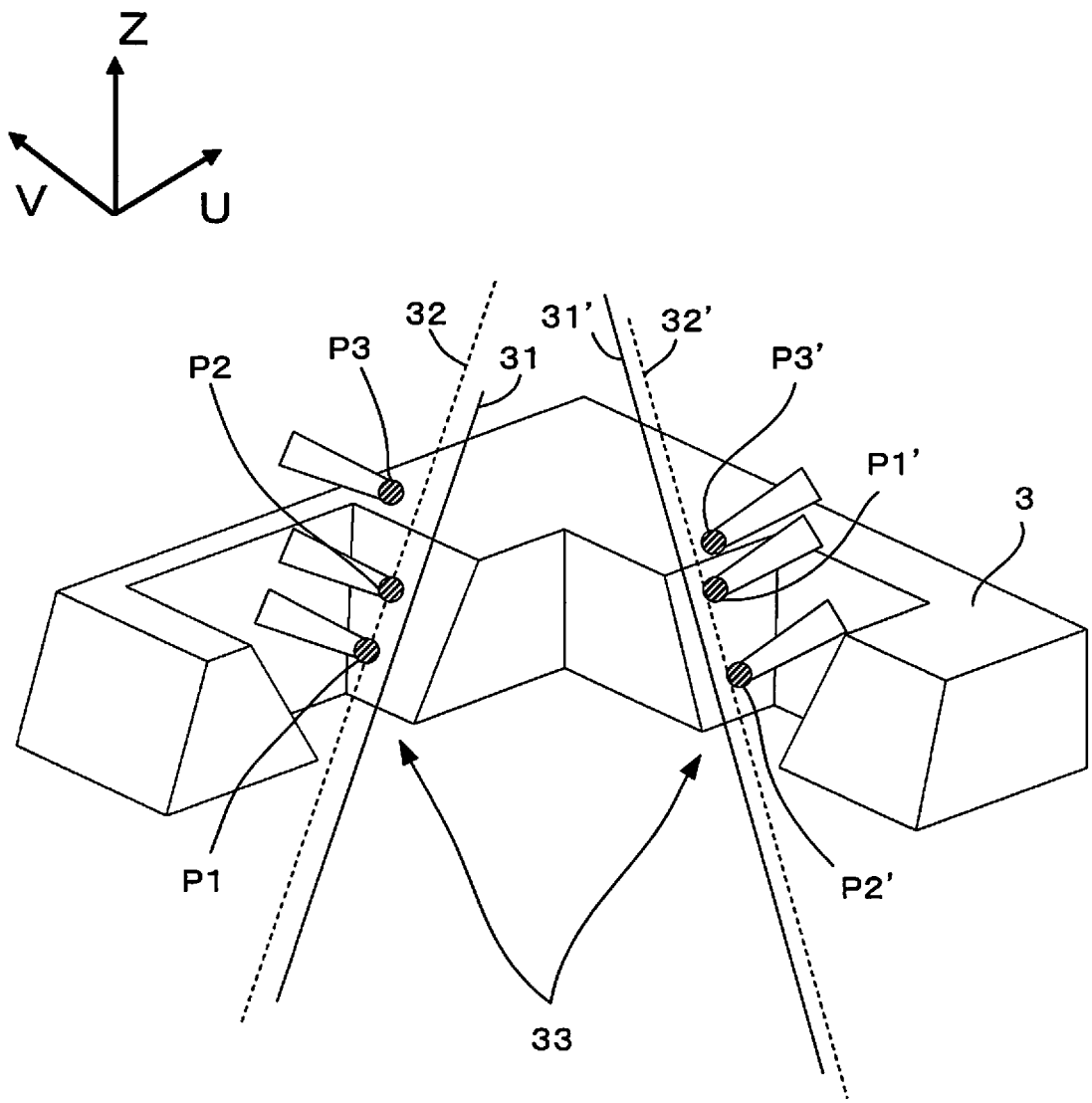
FIG. 8 is a diagram illustrating correction when there are a plurality of tapering processes in predetermined positions in a machining program.

(2) When a plurality of tapering machinings are performed at predetermined positions in the machining program as shown in FIG. 8, test machining is first performed and measurement and correction are made for each tapered section in the program. When actual machining is performed, a corrected value is input for each tapered section and then machining is performed. In FIG. 8, reference numeral 31' represents the wire electrode that is being machined and reference numeral 32' represents the line of intersection, for the measurement positions P1', P2' and P3'.

(3) Instead of machining another workpiece as described in (2) above, it is also possible to machine a workpiece for production machining by an amount of machining less than a target amount with an offset applied to the machining program path, measure and correct each tapered section, thereby machining the workpiece into the actual machining shape.

(4) In tapering including a plurality of finish machining, test machining described in (1) or (2) above is not required. Each time machining is completed, each tapered section in the program is measured, corrected, and machining is performed using each correction value in each tapered section in the next finishing.

(5) If there is a deviation, as a result of measurement in (2), (3), and (4) above, on the side of a part left over by machining with respect to the target shape dimension, additional machining is made again based on the corrected result so that the target shape is achieved.

The present invention eliminates the need for an expensive optical microscope or three-dimensional measurement instrument for measuring a tapered shape, as described above. It also saves steps for removing the workpiece from the machine and setting up the workpiece on a measurement instrument to measure a taper angle, and prevents deviation in the position of the workpiece when setting up the workpiece on the machine again. In addition, the workpiece can be continuously finished after being measured or additionally machined so as to fall within the dimensional tolerance. Since measurement machining and calculation for obtaining a correction value are performed automatically, the number of man-hours can be reduced significantly, enabling accurate automatic tapering at high precision.

The invention claimed is:

1. A wire electric discharge machine that performs machining by moving a wire electrode stretched between an upper wire guide and a lower wire guide relative to a table on which a workpiece is placed, the wire electric discharge machine comprising:
   a wire guide moving means for slanting the wire electrode at a predetermined angle;
   a contact detector disposed on the upper wire guide;
   a means for calculating a taper angle of a tapered section of a tapered workpiece mounted on the table, based on positions obtained through measurement, by the contact detector, of two points at arbitrary heights on the tapered section; and
   a means for calculating wire support positions of the upper wire guide and the lower wire guide that give a target taper angle and a target shape dimension, based on a position of any one of the two points measured, the calculated taper angle, the upper surface position of the workpiece obtained through measurement by the contact detector, and a position at which the tapered section and the upper surface of the workpiece intersect when there is no machining error.

2. A wire electric discharge machine that performs machining by moving a wire electrode stretched between an upper wire guide and a lower wire guide relative to a table on which a workpiece is placed, the wire electric discharge machine comprising:
   a wire guide moving means for slanting the wire electrode at a predetermined angle;
   a contact detector disposed on the upper wire guide;
   a means for calculating a taper angle of a tapered section of a tapered workpiece mounted on the table, based on positions obtained through measurement, by the contact detector, of two points at arbitrary heights on the tapered section; and
   a means for calculating wire support positions of the upper wire guide and the lower wire guide that give a target taper angle and a target shape dimension, based on a position of any one of the two points measured, a position of the tapered section at a height of the position of the one of the two points when there is no machining error, and the calculated taper angle.

3. The wire electric discharge machine according to claim 2, further comprising:
   a storage means for performing the measurement at intervals of the predetermined taper angle and storing in advance the wire support positions of the upper wire guide and the lower wire guide at intervals of the predetermined taper angle,
   wherein, when a tapering command is issued, the upper wire guide and the lower wire guide are moved in accordance with the wire support positions of the upper wire guide and the lower wire guide stored in the storage means.

4. The wire electric discharge machine according to claim 1,
   wherein the measurement is performed for each tapered section of a machined workpiece so as to calculate the wire support positions of the upper wire guide and the lower wire guide for each tapered section.

5. A method for calculating wire support positions of a wire electric discharge machine that performs machining by moving a wire electrode stretched between an upper wire guide and a lower wire guide relative to a table on which a workpiece is placed, the method comprising the steps of:
   performing tapering in accordance with a machining program;
   measuring two arbitrary points on a tapered section using a contact detector disposed on the upper wire guide;
   calculating an angle of the tapered section based on positions of the two measured points; and
   calculating wire support positions of the upper wire guide and the lower wire guide that give a target taper angle and a target shape dimension based on a position of any one of the two measured points, the calculated taper angle, and a position at which the tapered section and an upper surface of the workpiece intersect when there is no machining error.

6. A method for calculating wire support positions of a wire electric discharge machine that performs machining by moving a wire electrode stretched between an upper wire guide and a lower wire guide relative to a table on which a workpiece is placed, the method comprising the steps of:

performing tapering in accordance with a machining program;

measuring two arbitrary points on a tapered section using a contact detector disposed on the upper wire guide;

calculating an angle of the tapered section based on positions of the two measured points; and calculating wire support positions of the upper wire guide and the lower wire guide that give a target taper angle and a target shape dimension based on a position of any one of the two measured points, a height of the tapered section when there is no machining error at a height of the position of the one of the two measured points, and the calculated taper angle.

* * * * *